May 26, 1959

O. L. ANDERSON 2,888,316

APPARATUS FOR APPLYING ISOTROPIC PRESSURE
AT ELEVATED TEMPERATURE TO WORK PIECES
Filed May 31, 1955

INVENTOR
O. L. ANDERSON
BY
*H. O. Wright*
ATTORNEY

United States Patent Office 2,888,316
Patented May 26, 1959

2,888,316

APPARATUS FOR APPLYING ISOTROPIC PRESSURE AT ELEVATED TEMPERATURE TO WORK PIECES

Orson L. Anderson, Morristown, N.J., assignor to Bell Telephone Laboratories, Incorporated, New York, N.Y., a corporation of New York Application May 31, 1955, Serial No. 511,889

6 Claims. (Cl. 18—47)

This invention relates to an apparatus for subjecting work pieces, such as a glass object or a quantity of a powdered substance, or the like, simultaneously to isotropic high pressure and high temperature for protracted time intervals.

As disclosed and described in detail in my copending application Serial No. 511,888, filed May 31, 1955, which matured into Patent 2,865,139, granted December 23, 1958, the treatment of glass by subjecting it to combinations of isotropic pressures, in the order of six to sixty thousand pounds per square inch and temperatures of several hundred degrees centigrade for intervals from one hour to one week or more, has been found to afford an accurate and advantageous way of modifying and controlling many of the characteristics of the glass such as its density, index of refraction, color, conductivity and numerous other characteristics.

The principal object of the present invention is, accordingly, to provide a practicable, convenient, safe and economical means for subjecting a work piece, either solid or powdered, to predetermined combinations of isotropic high pressures and high temperatures for protracted intervals of time.

Other and further objects, features and advantages of the present invention will become apparent during the course of the following detailed description given hereinunder and from the appended claims.

An outstanding problem in connection with the attainment of the objects of the present invention is that of obtaining a pressure transmitting medium which can be conveniently employed in accordance with the invention and which will not break down, nor chemically react with or otherwise contaminate either the work piece or the apparatus, under the combinations of pressure, tempearture and time interval required to effect the contemplated modifications in the characteristics of the work piece being treated. Another problem is that of accurately maintaining the required pressures and temperatures during the necessary time intervals.

As a preferred pressure transmitting medium for numerous applications, applicant has discovered that a number of fluorocarbon resins (A number of forms of these resins are sold under trade names such as "Teflon," "Kel-F," et cetera.) can be satisfactorily employed despite the fact that they are solids at room temperature and atmospheric pressure. The substance "Teflon," which is tetrafluoroethylene resin, is of particular interest in connection with arrangements of the present invention for reasons which will be explained in detail hereinbelow.

The present invention involves the shaping (by machining or otherwise) of two or more portions of a fluorocarbon resin at room temperature and atmospheric pressure (i.e., in its solid state) so that when assembled in the pressure chamber a cavity will be provided in the resin into which the work piece to be processed (which can be, by way of example, a one piece solid object or a quantity of a powdered substance) will snugly fit and can thus be embedded in the resin. The assembled portions of the shaped resin, preferably, accurately fill substantially all other space within the pressure chamber.

The pressure chamber preferably includes, in addition to a space sufficient to accommodate the work piece to be processed, a cylindrical space of relatively small diameter communicating with the first mentioned space. A plunger or piston accurately fitting the small diameter cylindrical space is then employed to apply pressure to the resin. An accurately fitted closure member, which may be a threaded plug which can be readily removed, provides for closure of one side of the space within which the work piece to be processed is assembled and upon removal affords convenient access to the chamber for inserting and/or removing the resin members and the embedded work piece to be processed. Heating means and means for applying pressure, together with instruments from which the temperature and pressure obtaining within the chamber can be read, complete the structure required for practicing the invention. An illustrative structure will be described in detail hereinunder.

The resin will become a liquid as the pressure and temperature are raised and has been successfully employed under pressures exceeding fifty thousand pounds per square inch and at temperatures in the order of 300 degrees centigrade without breaking down or otherwise giving evidence of decomposition. A slight clearance providing a venting passage between the plunger or picton and its associated cylindrical portion of the chamber, just sufficient to permit a very slight oozing of the liquified resin past the piston, assures the maintenance of isotropic pressure within the chamber. Alternatively, a very small vent through the plunger or piston, or the upper side wall of the chamber just below the lowest position likely to be reached by the piston in tests of the longest duration, can be provided. The use of a slight clearance between the plunger or piston and the cylinder, however, is preferable since binding or jamming of the piston in the cylinder is thereby rendered much less likely and the pressure applied to the piston can then, with more assurance, be assumed to be transmitted to the contents of the pressure chamber. The fluorocarbon resin known as "Teflon" has the additional advantage of being highly viscous in its liquid state so that only a very small amount was, for example, found to ooze past a piston substantially three-eighths of an inch in diameter having a clearance of two-thousandths of an inch with its associated cylinder under a pressure of fifty-four thousand pounds per square inch and a temperature of 275 degrees centigrade during a test interval of two hundred hours. Obviously such leakage or oozing should be very small since, as taught in my above mentioned copending application, the treatments contemplated are to be continuously applied for periods of several hundred hours in many instances, so that any substantial loss of the pressure medium would be clearly undesirable.

The principles of the present invention will become more readily apparent during the course of the following detailed description of illustrative structures, suitable for practicing the invention, shown in the accompanying drawing, in which.

Figure 1:
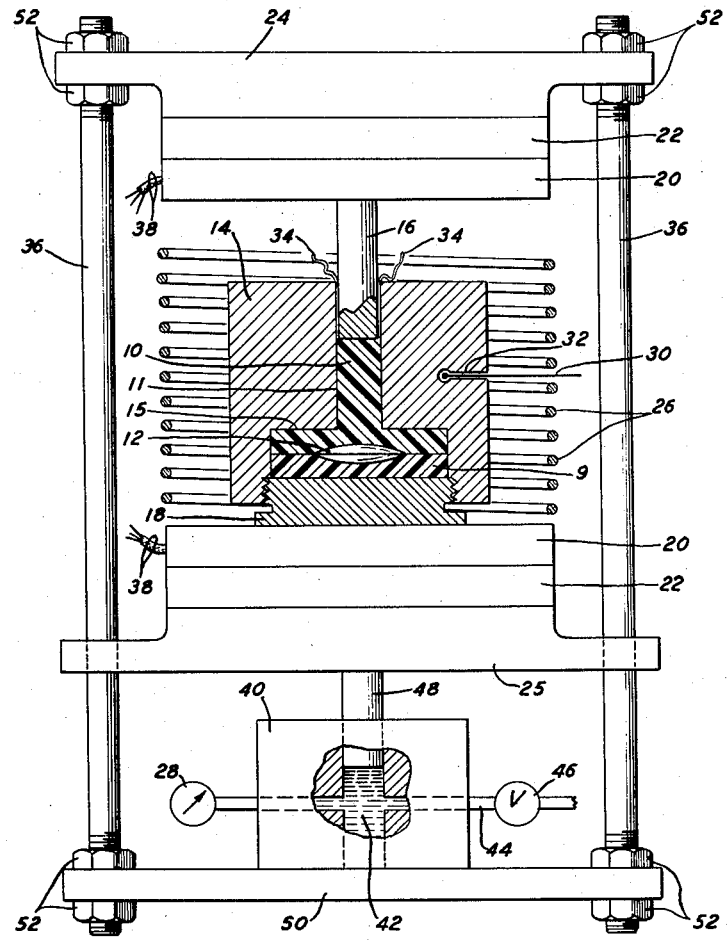
Fig. 1 shows an overall arrangement for practicing the present invention.

In more detail, in Fig. 1 of the drawing, a cylindrical steel jacket or pressure chamber 14 has concentrically arranged within it a larger cylindrical opening or space 15 into which a smaller cylindrical passage 11 opens directly, the latter extending vertically through one end of jacket 14 as shown.

The lower side of the larger opening 15 is provided with a threaded plug 18, the threads of which fit accurately with internal threads on jacket 14 at the bottom of opening 15. Removal of threaded plug 18 thus affords easy access to opening 15. A cylindrical plunger, or piston, 16 is accurately machined to provide a sliding fit in the cylindrical passage 11 (for example, two-thousandths of an inch clearance for a plunger diameter of substantially three-eighths of an inch).

Provision for heating the assembly comprising jacket 14, plug 18 and plunger 16, together with the work piece 12 and portions 9 and 10 of the pressure medium to be assembled within jacket 14, is made by positioning electrically energized heating platens 20, having power leads 38, above and below the assembly and surrounding the assembly by heating coil 26.

Heat insulating members 22, which may preferably be layers of asbestos, are then provided above and below the upper and lower heating platens 20, respectively, as shown, and the combination is held between the upper end plate 24 and the movable platen 25 of a press. Platen 25 is free to move vertically on stanchions 36, the ends of which are threaded and fastened to upper end plate 24 and lower end plate 25 by nuts 52, as shown. A hydraulic jack 40 having a piston 48 is placed between platen 25 and the lower end plate 50, as shown. The interior of the jack cylinder is, of course, filled with a hydraulic fluid 42 and connection to a source of pressure (not shown) is made through pipe 44 in which is included a control valve 46. Conventional pressure gauge 28 indicates the force exerted by the jack.

Pieces 9 and 10 are machined preferably from the fluorocarbon resin, tetrafluoroethylene resin, commercially available under the trade name "Teflon," to completely fill the spaces 11 and 15, except for a recess into which the work piece to be treated (in this instance a glass lens 12) will snugly fit and can thus be conveniently embedded in the resin for processing in accordance with the principles of the present invention.

For processing the glass lens 12 to increase its refractive index, by way of example, in accordance with the teachings of my above mentioned copending application filed May 31, 1953, the jacket assembly 14 and all that is within it or adjacent thereto, as above described, is heated by platens 20 and coil 26 until thermocouple 30 in well 32 of jacket 14 indicates that a temperature of 275 degrees centigrade has been reached, after which power to the heating elements is regulated to maintain that temperature for the duration of the treatment of the lens. Alternatively, thermocouple 30 may, of course, be replaced by a conventional glass thermometer or a bimetallic type of thermometer.

Next, pressure is applied by turning valve 46 and observing conventional pressure gauge 28 until the force exerted by jack 40 on platen 25 corresponding to a pressure inside the chamber of fifty-four thousand pounds per square inch by way of specific example (within spaces 11 and 15) is reached. This pressure is then maintained for the duration of the treatment, except that to eliminate "densification," as taught in my above mentioned copending application, the pressure should be reduced to substantially atmospheric pressure several hours before the temperature is reduced to room temperature. Other work pieces than of glass can obviously be inserted in the manner described above and subjected to any of numerous combinations of temperature and pressure for various intervals of time, in order to determine the effect of such treatment on the particular material, as may be deemed desirable.

Because of the sliding fit between plunger 16 and opening 11, a very slight amount of the resin within portion 10 will ooze past the plunger 16 and emerge as very thin ribbons 34 at the upper surface of jacket 14, as indicated in the drawing. This assures the maintenance of isotropic pressure throughout the interior of the pressure chamber, i.e., spaces 11 and 15, during the treatment. The fluorocarbon resins are chemically inert and self "lubricating," in that they are readily removed from the jacket 14 and the work piece 12 when the treatment has been completed. They, of course, become fluid under the temperatures and pressures employed during the treatments contemplated but do not tend to break down, decompose nor react chemically with any materials whose properties are likely to be investigated by the methods of the present application. They furthermore have such high viscosity in the fluid state under the ranges of temperature and pressure employed in connection with the present invention that leakage past the plunger can readily be held to a negligible amount.

Figure 2:
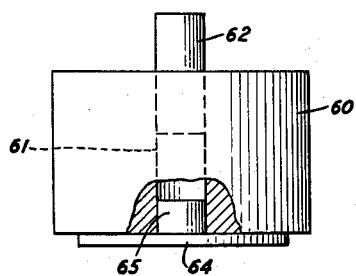
Fig. 2 shows a very simple pressure chamber for use in practicing the present invention.

In Fig. 2 a particularly simple and convenient pressure chamber for use in testing small samples, either solid or powdered, in accordance with the present invention, is shown. It comprises a steel cylinder 60 substantially two inches in diameter and one and one quarter inches long, through the center of which a cylindrical hole 61 substantially three-eighths of an inch in diameter has been bored. Closure piece 64 comprises a circular plate portion one and five-eighths inches in diameter by five-sixteenths of an inch thick, having a stub 65 concentrically located on its upper surface. Stub 65 is one quarter of an inch high and substantially three-eighths of an inch in diameter, being machined to a sliding fit in hole 61. A cylindrical plunger 62, seven-eighths of an inch long, is also machined to a sliding fit with hole 61 (clearance two-thousandths of an inch). The overall assembly of Fig. 2 can then be substituted for the pressure chamber 14, 16, 18 of Fig. 1, the sample to be tested being embedded in a cylinder of "Teflon" which also has a sliding fit in hole 61.

Figure 3:
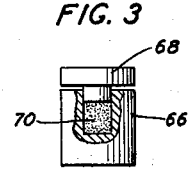
Fig. 3 shows a capsule adapted for use in the processing of powdered material.

In Fig. 3 a "Teflon" cylinder, including a body portion 66 and a cap portion 68, particularly adapted for use in testing a sample of powdered material 70 in the pressure chamber of Fig. 2 is shown. Cylinder 66, 68 has an external diameter of substantially three-eighths of an inch such that it has a sliding fit with hole 61 of the chamber of Fig. 2. Its length, including cap portion 68, is substantially one half inch and it has within portion 66 a concentric, cylindrical cavity approximately one quarter of an inch in diameter and one quarter of an inch deep from the upper edge of portion 66. Cap portion 68 has a small stub on the lower side fitting snugly into the cavity in the portion 66 and filling approximately the upper half of said cavity. To test a powdered material, a sample thereof, sufficient to half fill the cavity, is placed in the cavity of the main portion 66 and the cap portion 68 is then placed on portion 66 to slightly compress the powder so that it is held firmly in position. During treatment at temperatures of 100 degrees centigrade or higher and pressures of six to sixty thousand pounds per square inch, the "Teflon" cylinder will become liquid, but because of its high viscosity and the isotropic pressure to which it is subjected in the pressure chamber of Fig. 2, it will not become mixed with the powdered sample. Upon subsequently being cooled following the completion of the treatment it solidifies. The slightest bit of oil, such, for example, as that deposited by rubbing the interfaces of adjoining surfaces with a finger, will suffice to prevent the two or more portions of a "Teflon" assembly of the invention from becoming fused together during treatment even at temperatures in the order of 300 degrees centigrade so that after cooling the original "Teflon" parts can be readily separated and the embedded work piece of solid or powdered material may be readily removed.

A pressure chamber, substantially as shown in Fig. 2 and described in detail above, has been found eminently satisfactory for use with pressures up to sixty thousand pounds per square inch and temperatures up to 300 degrees centigrade, when its parts have been made from an ordinary grade of strong molybdenum steel such as that designated by the trade name "Ketos."

The overall process of the invention employing work pieces embedded in "Teflon" in a simple steel pressure chamber with slight clearance around the plunger or piston by which the pressure is applied minimizes, or eliminates entirely, the majority of the serious problems usually encountered in attempts to treat work pieces at relatively high pressures and temperatures. Among such hazards are "flying projectiles" (or fragments) in case portions of the apparatus fracture under the pressure and temperature being applied; burning of the operator by jets of hot vapor or gas when disassembling the apparatus to remove the work piece; poisoning by "hypodermic" action of a high velocity jet of fluid if the fluid is toxic; and explosions when highly combustible pressure mediums such as gasoline are employed. A serious problem in many instances is that of obtaining a leakproof seal around the plunger or piston where a gas, or a liquid of low viscosity under the prescribed operating conditions, is employed. Obviously all of the above, but the possible hazard of flying fragments, are entirely eliminated by the present invention. This remaining hazard can by proper care in design be so substantially reduced, in view of the simplicity of the compression chambers and the method of applying pressures, as to be substantially negligible. Furthermore, any ordinary type of press can be employed to provide the pressure so that the necessity of obtaining a highly specialized single use press is also eliminated. The simplicity and economical character of these arrangements are self evident.

Numerous other arrangements within the spirit and scope of the principles of the present invention can readily be devised by those skilled in the art. The embodiments described hereinabove are, accordingly, to be understood to be merely illustrative of said principles.

What is claimed is:

1. Apparatus for providing high isotropic pressure at an elevated temperature to a work piece, which apparatus includes a pressure chamber consisting of a strong, rigid steel jacket surrounding a space extending through said jacket, a portion at least of said space extending from one end of said space being substantially larger than the space occupied by said work piece, a removable steel plug adapted to securely and tightly close said one end of said space in said jacket, and an elongated steel plunger having a close sliding fit with the opposite end of said space in said jacket, an element of a solid pressure medium material which will become fluid and highly viscous at said elevated temperature and the pressure to be applied, said element being shaped to accurately conform to and completely fill the remainder of said space within said jacket after said removable plug has been placed in position to close one end and said plunger has been partly inserted in the other end, said element providing an internal recess therein into which the work piece to be treated can be snugly assembled, means for heating said chamber and its contents to a predetermined elevated temperature, and means for applying pressure by way of said plunger to the contents of said chamber.

2. The apparatus of claim 1 in which said chamber is provided with small venting means whereby said pressure medium material upon becoming fluid can slowly ooze from said chamber thus indicating the maintenance of isotropic pressure within said chamber.

3. The apparatus of claim 2 in which said pressure medium is a fluorocarbon resin.

4. The apparatus of claim 2 in which said pressure medium is tetrafluoroethylene resin.

5. The apparatus of claim 1 in which said pressure medium is a fluorocarbon resin.

6. The apparatus of claim 1 in which said pressure medium is tetrafluoroethylene resin.

References Cited in the file of this patent

UNITED STATES PATENTS

| | | |
|---|---|---|
| 1,415,516 | Bridge | May 9, 1922 |
| 2,092,001 | McDougal | Sept. 7, 1937 |
| 2,317,597 | Ford et al. | Apr. 27, 1943 |
| 2,367,111 | Fowler et al. | Jan. 9, 1945 |
| 2,470,089 | Booth | May 17, 1949 |
| 2,552,027 | Bird et al. | May 8, 1951 |
| 2,714,226 | Axelrod | Aug. 2, 1955 |
| 2,745,139 | Burton | May 15, 1956 |

FOREIGN PATENTS

| | | |
|---|---|---|
| 2,488,446 | Switzerland | Nov. 15, 1949 |